United States Patent
Iima

(10) Patent No.: US 7,765,335 B2
(45) Date of Patent: Jul. 27, 2010

(54) COMMUNICATION SYSTEM, COMMUNICATION DEVICE AND FLOW CONTROL BASED ON STATUS INFORMATION OF DATA BUFFER USAGE

(75) Inventor: Tomofumi Iima, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 240 days.

(21) Appl. No.: 12/010,253

(22) Filed: Jan. 23, 2008

(65) Prior Publication Data

US 2008/0183915 A1 Jul. 31, 2008

(30) Foreign Application Priority Data

Jan. 29, 2007 (JP) .............................. 2007-017646

(51) Int. Cl.
*G06F 3/00* (2006.01)
(52) U.S. Cl. .............................. 710/19; 710/29; 710/53; 710/54; 710/55; 710/56; 710/57
(58) Field of Classification Search ........................ None
See application file for complete search history.

(56) References Cited

U.S. PATENT DOCUMENTS 6,522,271 B2 2/2003 Calvignac et al.
7,039,010 B2 * 5/2006 Ni .............................. 370/229
7,421,522 B1 * 9/2008 van Wageningen ........... 710/52
2006/0236024 A1 * 10/2006 Saga et al. ................... 711/100

OTHER PUBLICATIONS

"System Packet Interface Level 4 (SPI-4)", Optical Internetworking Forum, Oct. 2003, pp. 1-73.

* cited by examiner

*Primary Examiner*—Alan Chen
(74) *Attorney, Agent, or Firm*—Foley & Lardner LLP

(57) ABSTRACT

A communication system complying with SPI-4 Phase 2 standard includes a local device, an opposing device, a first data channel to transfer payload data from the local to the opposing device, a second data channel opposed to the first data channel, and a first status channel to be able to transfer data from the local to the opposing device. The local device periodically outputs buffer status information of a data buffer for storing payload data received over the second data channel to the first status channel. Further, the local device inserts the buffer status information between the payload data according to a priority of the buffer status information in order to output the buffer status information to the first data channel. The opposing device controls to output payload data to the second data channel according to the buffer status information received over the first status channel and the first data channel.

20 Claims, 14 Drawing Sheets

Fig. 1

COMMUNICATION SYSTEM, COMMUNICATION DEVICE AND FLOW CONTROL BASED ON STATUS INFORMATION OF DATA BUFFER USAGE

BACKGROUND OF THE INVENTION

1. Field of the Invention

The present invention relates to communication devices, and especially to communication devices for performing flow control with an opposing communication device.

2. Description of Related Art

In order to ensure interconnectivity between communication devices which are manufactured by different manufacturers, there is SPI-4 Phase 2 standard as a communication interface standard defined by OIF (Optical Internetworking Forum). The details of the SPI-4 Phase 2 standard are specified in "System Packet Interface Level 4 (SPI-4)" 15 Oct. 2003. Hereinafter, communication interface specified by the SPI-4 Phase 2 standard is referred to as SPI-4 interface.

The SPI-4 interface is an interface specified in order to interconnect a link layer device and a PHY device (see for example U.S. Pat. No. 6,522,271). A block diagram of a link layer device and a PHY device connected by the SPI-4 interface is shown in FIG. 8. The inventor has prepared FIG. 8 to explain the SPI-4 interface. A link layer device 7 shown in FIG. 8 includes a transmit unit 71 for transmitting payload data to an opposing PHY device 8 and a receive unit 72 for receiving payload data transmitted from the PHY device 8. Note that the SPI-4 Phase 2 standard defines the direction in which payload data proceeds from the link layer device 7 to the PHY device 8 as "transmit direction" and the direction in which payload data proceeds from the PHY device 8 to the link layer device 7 as "receive direction".

As shown in FIG. 8, the SPI-4 interface includes a transmit data channel (TDAT), a transmit control channel (TCTL) and a transmit data clock channel (TDCLK). TDAT is a channel having 16 bits wide for transmitting payload data from the transmit unit 71 to the PHY device 8. TCTL is a channel for transmitting a transmit control signal from the transmit unit 71 to the PHY device 8. The transmit control signal is a signal for notifying the type of the data transmitted over TDAT to the PHY device 8. To be more specific, when TCTL is High level, it means that a control word is present on TDAT. On the other hand, when TCTL is Low level, it means that payload data is present on TDAT. TDCLK is a channel for transferring a transmit clock of TDAT and TCTL. Each signal channel of TDAT and TCTL changes its value in synchronization with both rising and falling edges of TDCLK.

An example of the transmission waveform of TDAT, TCTL and TDCLK is shown in FIG. 9. The inventor has prepared FIG. 9 to explain the SPI-4 interface. In FIG. 9, "D" indicates payload data and "PC" indicates a payload control word defined in the SIP-4 Phase 2 standard. An ATM cell and an IP packet, etc. which are transmitted to the PHY device 8 are mapped in the payload data section of TDAT. The details of payload data is illustrated in SPI-4 Phase 2 standard (see FIG. 5.2 for example).

Furthermore, the SPI-4 interface includes a transmit status channel (TSTAT) and a transmit status clock channel (TSCLK). TSTAT is a channel having 2 bits wide for transmitting FIFO information from the PHY device 8 to the transmit unit 71. The FIFO information transmitted over TSTAT is information indicating the usage status of a FIFO buffer which stores payload data received by the PHY device 8 over TDAT. TSCLK is a channel for transferring a transmit clock of TSTAT. Each signal channel of TSTAT changes its value is synchronization with a rising edge of TSCLK.

An example of the transmission waveform of TSTAT and TSCLK is shown in FIG. 10. The inventor has prepared FIG. 10 to explain the SPI-4 interface. In FIG. 10, "F" represents a framing pattern for indicating a start position of a data frame which is transmitted over TSTAT. The framing pattern is used for synchronizing a data frame. "S0 to S15" are status words to which FIFO information is mapped. Each of the status word indicates the amount of data stored in a FIFO buffer and expressed as 2-bit data in the SPI-4 Phase 2 standard. In the example shown in FIG. 10, as 16 status words (S0 to S15) are included in one frame of TSTAT, FIFO information concerning 16 FIFO buffers can be transferred. Moreover, "DIP2" is a parity bit for error detection. The number (length) of the status words included in one frame of TSTAT is determined according to the number of the FIFO information which should be transmitted, that is, the number of FIFO buffers. The SPI-4 Phase 2 standard refers the status words length included in one frame of TSTAT as a calendar length. Moreover, the FIFO information regarding each FIFO buffer is periodically transferred for each frame. That is, a specific time slot (status word) included in a frame of TSTAT is allocated to one of several FIFO buffers according to an identifier of each FIFO buffer and is periodically transferred for each frame.

The SPI-4 interface has the same channels as "the transmit direction" stated above also for "the receive direction" in which payload data proceeds to the link layer device 7 from the PHY device 8. Specifically, the SPI-4 interface includes a receive data channel (RDAT), a receive control channel (RCTL) and a receive data clock channel (RDCLK). Furthermore, the SPI-4 interface includes a receive status channel (RSTAT) and a receive status clock channel (RSCLK). The explanation is omitted as the usage and transmission waveform of these channels are the same as the corresponding channels in the transmit direction.

Note that the frequency of the data clocks (TDCLK and RDCLK) mentioned above is specified to be 4 times more than the frequency of the status clocks (TSCLK and RSCLK). Therefore, suppose that one period of the status clocks (TSCLK and RSCLK) is a unit time, as shown in FIG. 11, while one status word is transferred over the status channels (TSTAT and RSTAT), 8 data words can be transferred over the data channels (TDAT and RDAT). In addition, the inventor has prepared FIG. 11 to explain the difference of data transfer rate between the status channel and the data channel. Since the status channels (TSTAT and RSTAT) are 2 bits wide and the data channels (TDAT and RDAT) are 16 bits wide, the data channels has a data transfer rate of 32 times more than the data transfer rate of the status channels.

Next, components included in the link layer device 7 shown in FIG. 8 are explained. The receive unit 72 has 4 FIFO buffers 122 to 125 for storing data received over RDAT. Note that the number of FIFO buffers which should be included in the receive unit 72 is not defined by the SPI-4 Phase 2 standard and it is needless to say that the FIFO buffer number shown in FIG. 8 is an example. The data received over RDAT is stored to one of the 4 FIFO buffers 122 to 125 by a receive data distribution unit 121. A FIFO information output unit 126 generates FIFO information corresponding to storage status of the received data in the FIFO buffers 122 to 125 and outputs the generated FIFO information to RSTAT.

A data output unit 711 included in the transmit unit 71 outputs payload data and a control word to TDAT. Moreover, a FIFO information receive unit 112 outputs a stop signal to the data output unit 711 based on the FIFO information obtained from the opposing PHY device 8 through TSTAT. Note that the details of flow control using FIFO information are described later. The data output unit 711 which received the stop signal suspends outputting data to a data transmission port (not shown) connected to TDAT until the stop signal is canceled.

Subsequently, the flow control using FIFO information in the conventional SPI-4 interface is explained hereinafter. In the SPI-4 Phase 2 standard, the usage condition of the FIFO buffer for storing the data received by the data channels (TDAT and RDAT) is categorized into either of three statuses, which are STARVING, HUNGRY and SATISFIED. Furthermore, a unique bit pattern is allocated to these three usage statuses by 2-bit FIFO information. FIG. 12 shows the relationship between the usage condition of the FIFO buffer and the FIFO information. The STARVING status indicates the status in which a buffer underflow is imminent. If the amount of stored data in the FIFO buffer is less than the first threshold AE, it is judged to be the STARVING state. The bit pattern of FIFO information indicating the STARVING status is "00". The SATISFIED status indicates that the FIFO buffer is almost full. If the amount of stored data of the FIFO buffer exceeds the second threshold AF, it is judged to be the SATISFIED status. Incidentally, it is needless to say that the second threshold AF is a larger value than the first threshold AE. The bit pattern of FIFO information indicating the SATISFIED status is "10". Lastly, the HUNGRY state indicates the status between the STARVING status and the SATISFIED status. The bit pattern of FIFO information indicating the HUNGRY status is "01".

The link layer device 7 and the PHY device 8 perform flow control for adjusting its own data transmission rate according to the FIFO information received from the opposing device over the status channels (TSTAT and RSTAT). Specifically, if the received FIFO information indicates the STARVING status, the highest data transmission rate is applied to the data channels (TDAT and RDAT). If the received FIFO information indicates the HUNGRY state, the data transmission rate of the data channels (TDAT and RDAT) is reduced as compared to the case of the STARVING state. Moreover, if the received FIFO information indicates the SATISFIED status, data transmission over the data channels (TDAT and RDAT) at least for a FIFO buffer which is in the SATISFIED status is suspended until the FIFO information changes.

There are two problems described below in the flow control using the FIFO information in the conventional SPI-4 interface.

The first problem is that priorities cannot be given to FIFO information. With the conventional SPI-4 interface, all the FIFO information that indicates the status of each of the plurality of FIFO buffers is uniformly transferred to the opposite side periodically over the status channels (TSTAT and RSTAT). Therefore, the conventional SPI-4 interface is difficult to deal with an urgent transmission request of FIFO information which is generated unexpectedly.

The second problem is that as the calendar length increases, a maximum value (hereinafter referred to as worst response time) of time required from a generation of a status change of the FIFO buffer until a flow control is performed by an opposing device also increases. The longer the worst response time, the lower the second threshold AF must be specified, thus the abovementioned second problem causes to reduce utilization efficiency of the FIFO buffer.

The second problem is explained in detail with reference to FIGS. 13 and 14. The inventor has prepared FIGS. 13 and 14 to explain the second problem. FIG. 13 shows an example of a data frame transferred over RSTAT. According to the example of FIG. 13, FIFO information concerning 10 FIFO buffers is periodically transferred by 10 status words (S1-S10). Moreover, FIG. 13 shows response time taken from a status change of the FIFO buffer of the identification number #5 included in the link layer device from the HUNGRY status to the SATISFIED status until data transmission to RDAT by the PHY device is suspended in response to the status change. This response time is determined by the sum of delay time Lat_a, Ts and Lat_c shown in FIG. 13. Accordingly, this response time indicates the longest time pending the FIFO information S5 (information indicating the status of the FIFO buffer of identification number #5) is updated.

In FIG. 13, delay time Lat_a is time after the status of the FIFO buffer #5 changes until FIFO information is generated and updated. Ts is the time for one cycle of the period when a framing pattern is repeated. In FIG. 13, Ts is 12×status clock period (RSCLK period). Note that RSCLK period shown in FIGS. 13 and 14 is the same value with TSCLK period. Delay time Lat_c is the time after the updated FIFO information is transmitted by the link layer device until the opposing PHY device performs flow control. Note that Lat_b shown in FIGS. 13 and 14 is the time for calendar length×RSCLK period.

Among the 3 delay time mentioned above, Lat_a and Lat_c are constant. On the other hand, the delay time Lat_b varies depending on the calendar length. Therefore, worst response time LWP in the SPI-4 interface is expressed by the sum of Lat_a, Lat_c and $T_s$ as shown in FIG. 13. Since the data frame cycle Ts of TSTAT increases as the calendar length increases, the worst response time LWP also increases as the calendar length increases.

SUMMARY

In one embodiment, a communication system complying with SPI-4 Phase 2 standard includes a local device, an opposing device, a first data channel for transferring payload data from the local device to the opposing device, a second data channel for transferring payload data from the opposing device to the local device and a first status channel to be able to transfer data from the local device to the opposing device. Further, the local device includes a data buffer for storing payload data received over the second data channel, a buffer status information output unit for periodically outputting buffer status information to the first status channel, the buffer status information indicating a usage status of the data buffer, and a buffer status information insert unit for inserting the buffer status information between the payload data according to a priority of the buffer status information and output the buffer status information to the first data channel. Moreover, the opposing device controls to output payload data to the second data channel according to the buffer status information received over the first status channel and the first data channel.

When conforming the communication system of said one embodiment to the SPI-4 interface, for example the first data channel corresponds to TDAT, the second data channel corresponds to RDAT, the first status channel corresponds to RSTAT and the buffer status information corresponds to FIFO information.

As described above, the communication system according to said one embodiment inserts the buffer status information (FIFO information) between the payload data according to a priority of the buffer status information (FIFO information) and outputs the buffer status information to the first data channel (TDAT). Therefore, it is possible to transmit buffer status information which should be preferentially and urgently transmitted using the first data channel (TDAT)

without waiting to transmit over the first status channel (RSTAT). Accordingly, unlike the configuration which transfers all the FIFO information periodically over a status channel in the conventional SPI-4 interface, a priority can be given to FIFO information, and flow control can be promptly performed according to high priority FIFO information.

Moreover, by transmitting buffer status information which should be preferentially and urgently transmitted using the first data channel (TDAT) without waiting to transmit over the first status channel (RSTAT), there is a benefit that the worst response time taken from a generation of a status change of the data buffer (FIFO buffer) until a flow control is performed by the opposing device is not dependent on the calendar length. That is, as the worst response time does not deteriorate even if the calendar length increases, utilization efficiency of the data buffer (FIFO buffer) can be improved.

The present invention enables to transmit FIFO information according to a priority thereof in communication systems complying with SPI-4 Phase 2 standard and also eliminates the dependency of the worst response time on the calendar length.

BRIEF DESCRIPTION OF THE DRAWINGS

The above and other objects and advantages and features of the present invention will be more apparent from the following description of certain preferred embodiments taken in conjunction with the accompanying drawings, in which.

DESCRIPTION OF THE PREFERRED EMBODIMENTS

Figure 1:
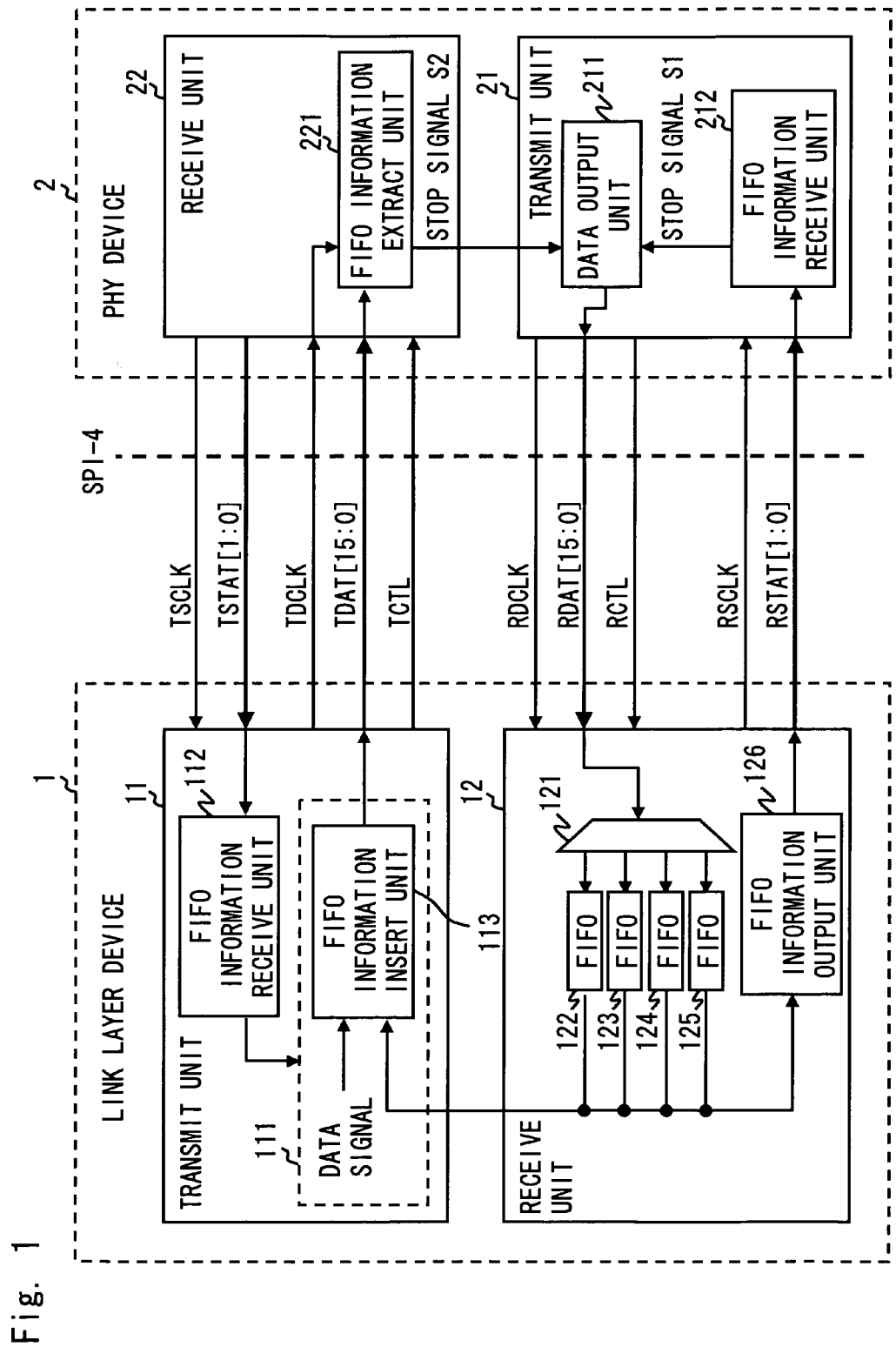
FIG. 1 is a block diagram of a link layer device and a PHY device connected by SPI-4.2 interface according to an embodiment of the invention.

The invention will now be described herein with reference to illustrative embodiments. Those skilled in the art will recognize that many alternative embodiments can be accomplished using the teachings of the present invention and that the invention is not limited to the embodiments illustrated for explanatory purposes.

Hereinafter, a detailed embodiment incorporating the present invention is described with reference to the drawings. In each drawing, components identical are denoted by reference numerals identical to those therein with detailed description omitted as necessary for the clarity of explanation. Incidentally, the embodiment shown below explains the case where a data buffer for storing payload data is a FIFO buffer.

First Embodiment

A block diagram of a communication system according to this embodiment is shown in FIG. 1. The communication system shown in FIG. 1 includes a link layer device 1 and a PHY device 2 which are connected by the SPI-4 interface improved by the present invention.

The link layer device 1 includes a transmit unit 11 and a receive unit 12. Each of a receive data distribution unit 121, FIFO buffers 122 to 125 and a FIFO information (buffer status information) output unit 126 included in the receive unit 12 may be the same as the components included in the abovementioned receive unit 72 of a related art.

A data output unit 111 included in the transmit unit 11 is the same as the data output unit 711 included in the transmit unit 71 of a related art in the points that payload data and a control word is output to TDAT and data output is suspended in response to a stop signal output from a FIFO information (buffer status information) receive unit 112. In addition to these, the data output unit 111 includes a FIFO information insert unit 113.

The FIFO information (buffer status information) insert unit 113 inserts FIFO information (buffer status information) indicating the data storage status of the FIFO buffers 122 to 125 between payload data and outputs FIFO information to TDAT. Incidentally, the trigger element for determining whether to output FIFO information to TDAT can be configured in various ways. In this embodiment, outputting or not outputting FIFO information to TDAT is to be determined by the priority of the FIFO information. For example, if the usage status of one of the FIFO buffers 122 to 125 has changed to the SATISFIED status, FIFO information indicating the status change and identification information (hereinafter referred to as a FIFO address) which can uniquely identify the FIFO buffer whose status has changed can be output to TDAT. Moreover, as another example, among the FIFO buffers 122 to 125, FIFO information indicating the status change and a corresponding FIFO address can be output to TDAT according to status change of a FIFO buffer specified with a higher priority in advance.

Figure 8:
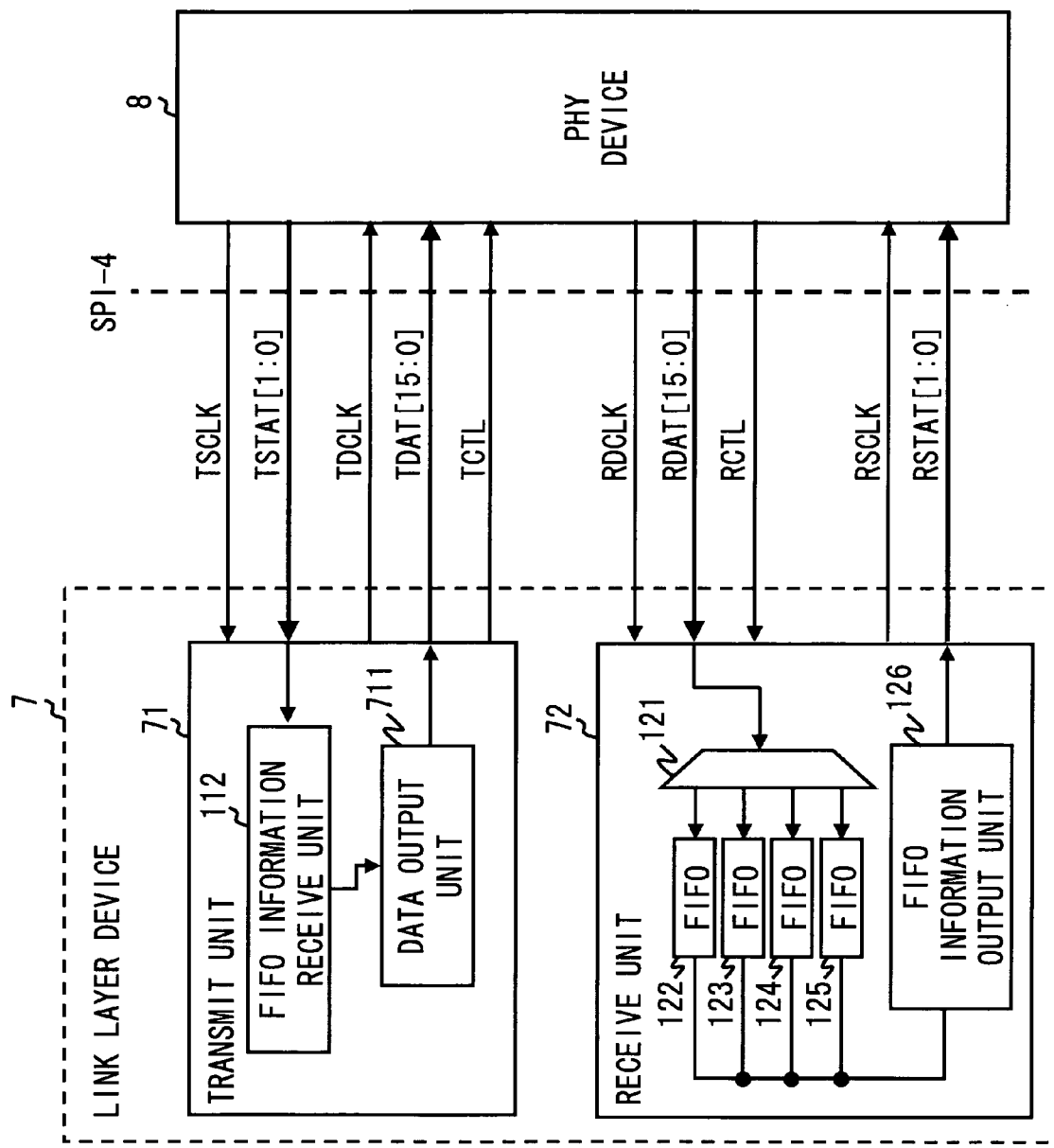
FIG. 8 is a block diagram of a link layer device and a PHY device connected by SPI-4.2 interface according to a related art.
Figure 9:
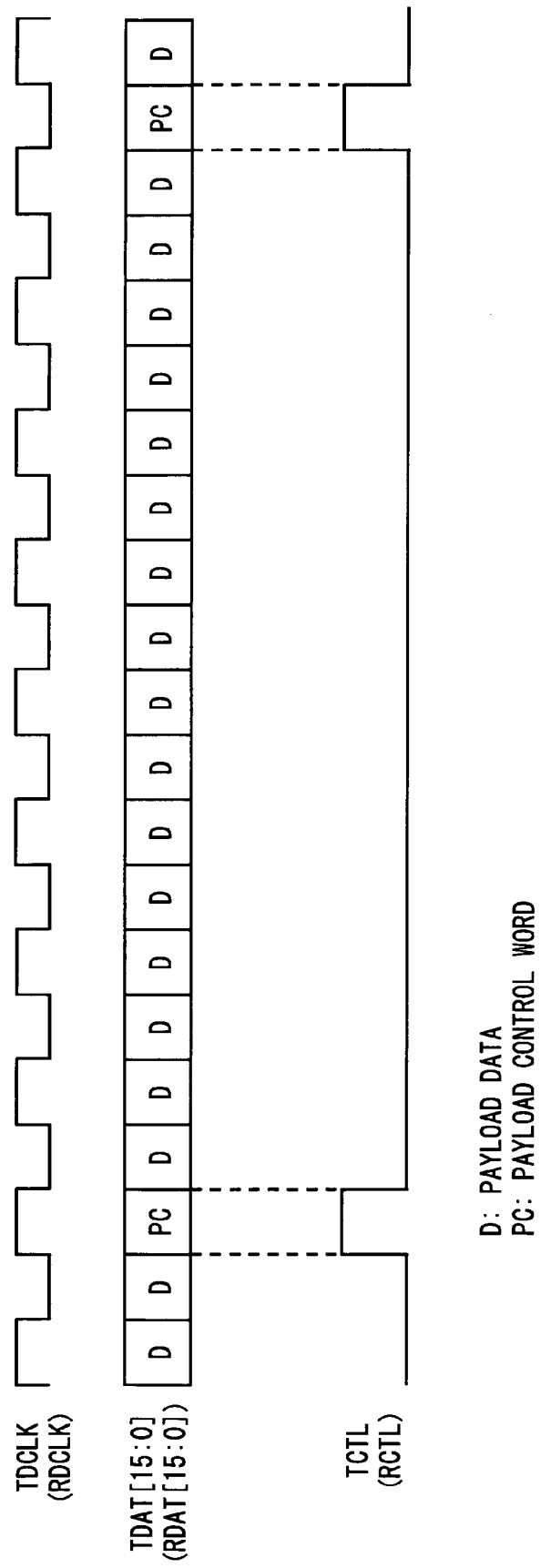
FIG. 9 shows a data signal (payload data and control word) transmitted over a data channel.
Figure 10:
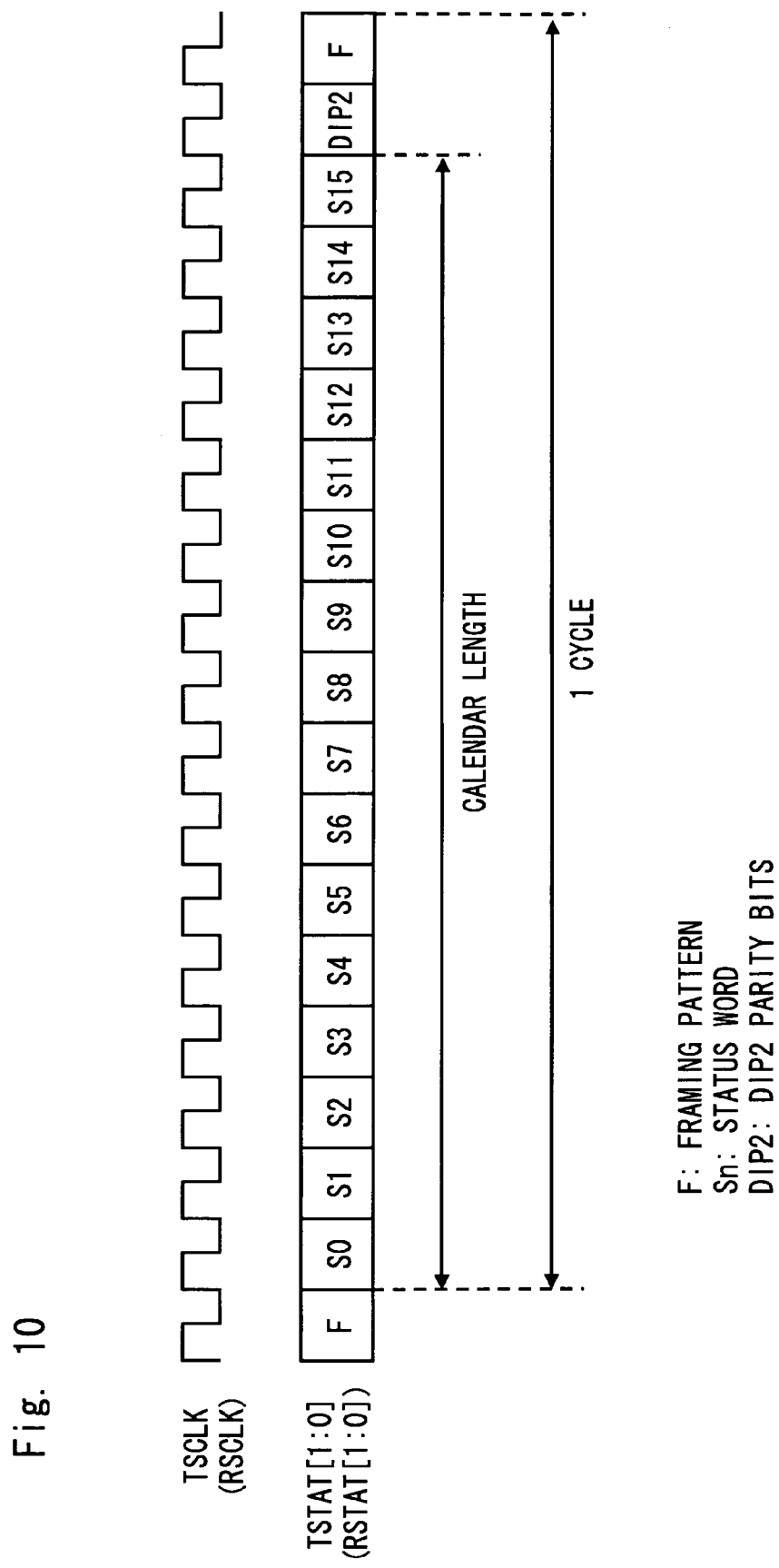
FIG. 10 shows a status signal transmitted over a status channel.
Figure 11:
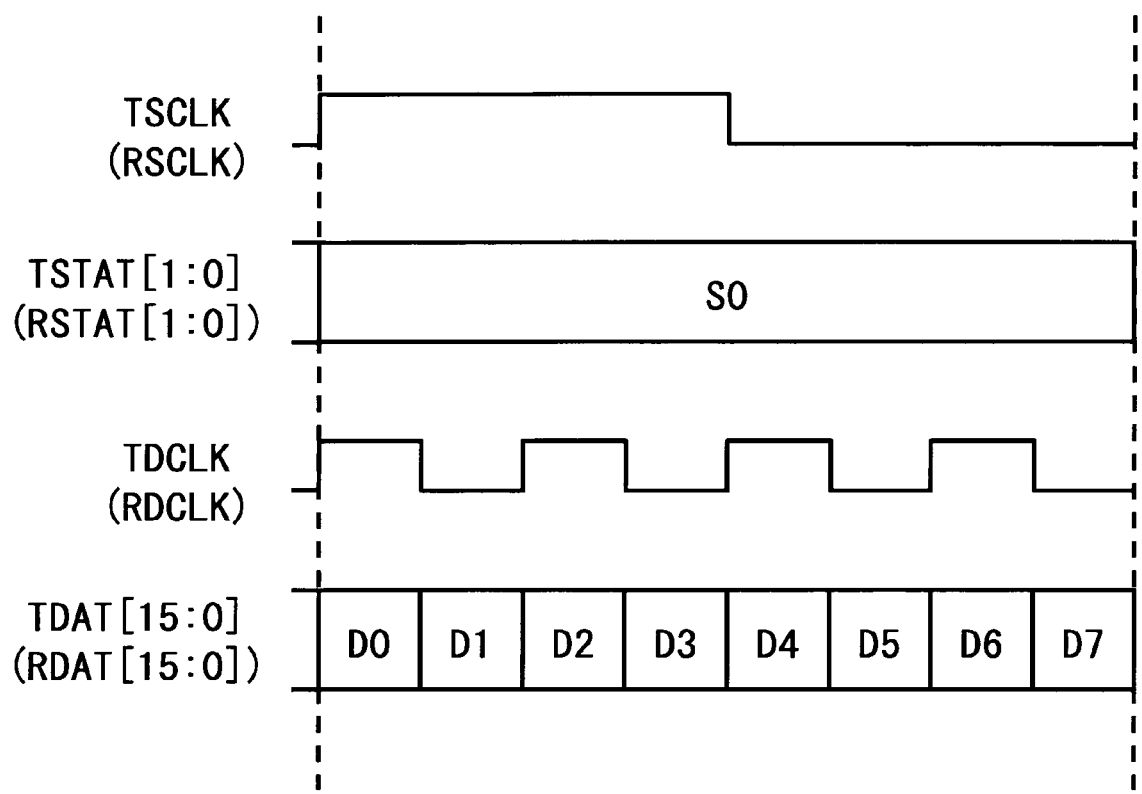
FIG. 11 explains a difference between data transfer rate of a status channel and a data channel.
Figure 12:
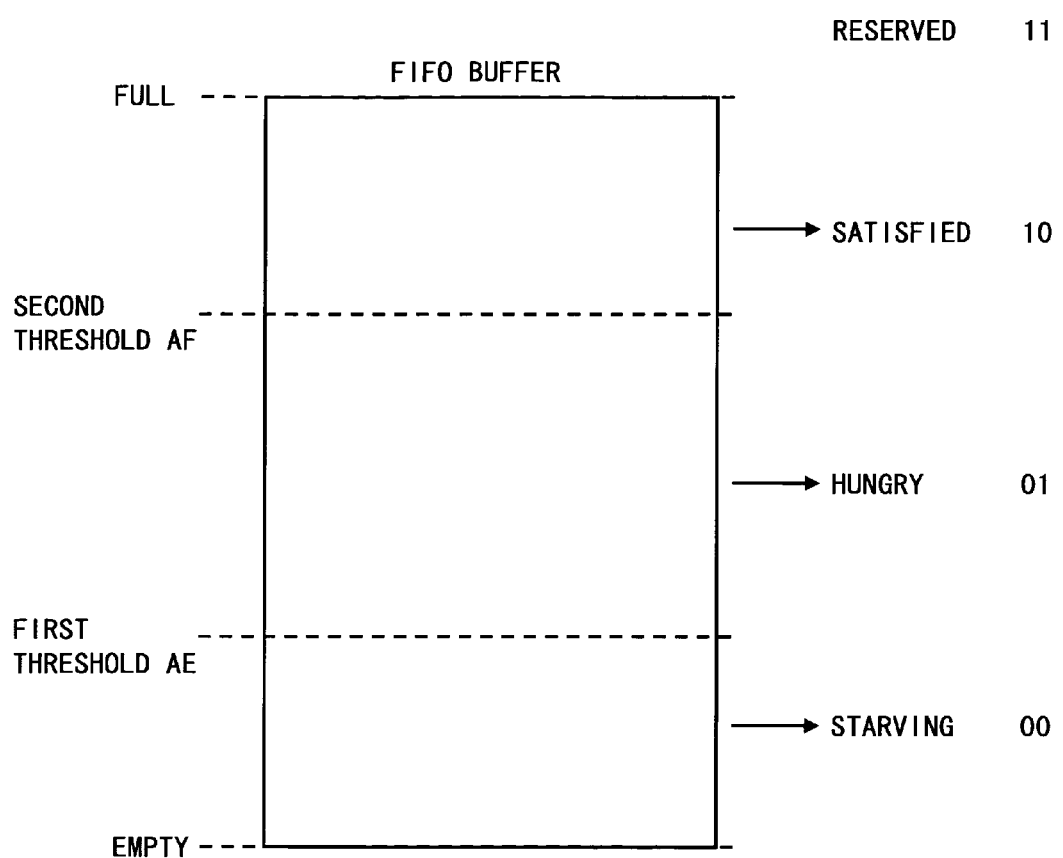
FIG. 12 shows a relationship between usage status of FIFO and format of FIFO information.
Figure 13:
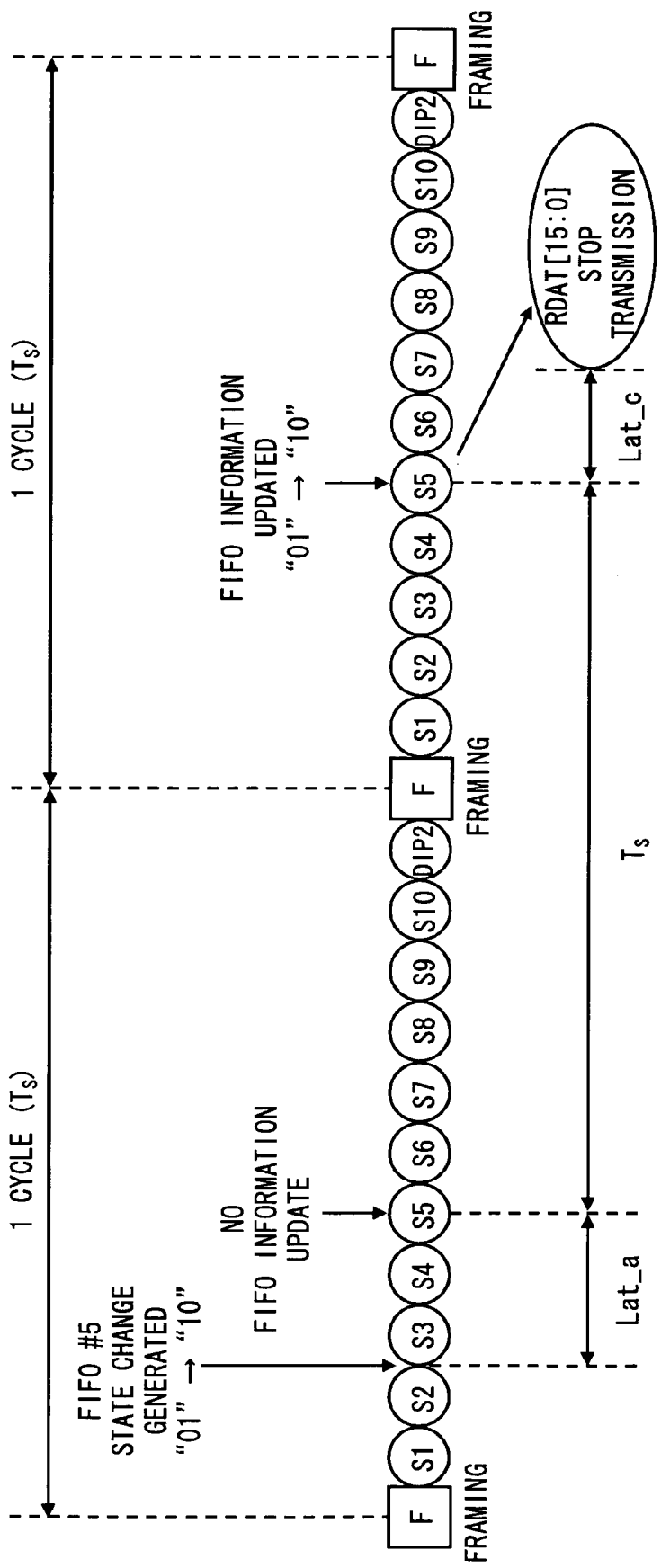
FIG. 13 explains worst response time by a flow control using a data channel according to an embodiment of the present invention.
Figure 14:
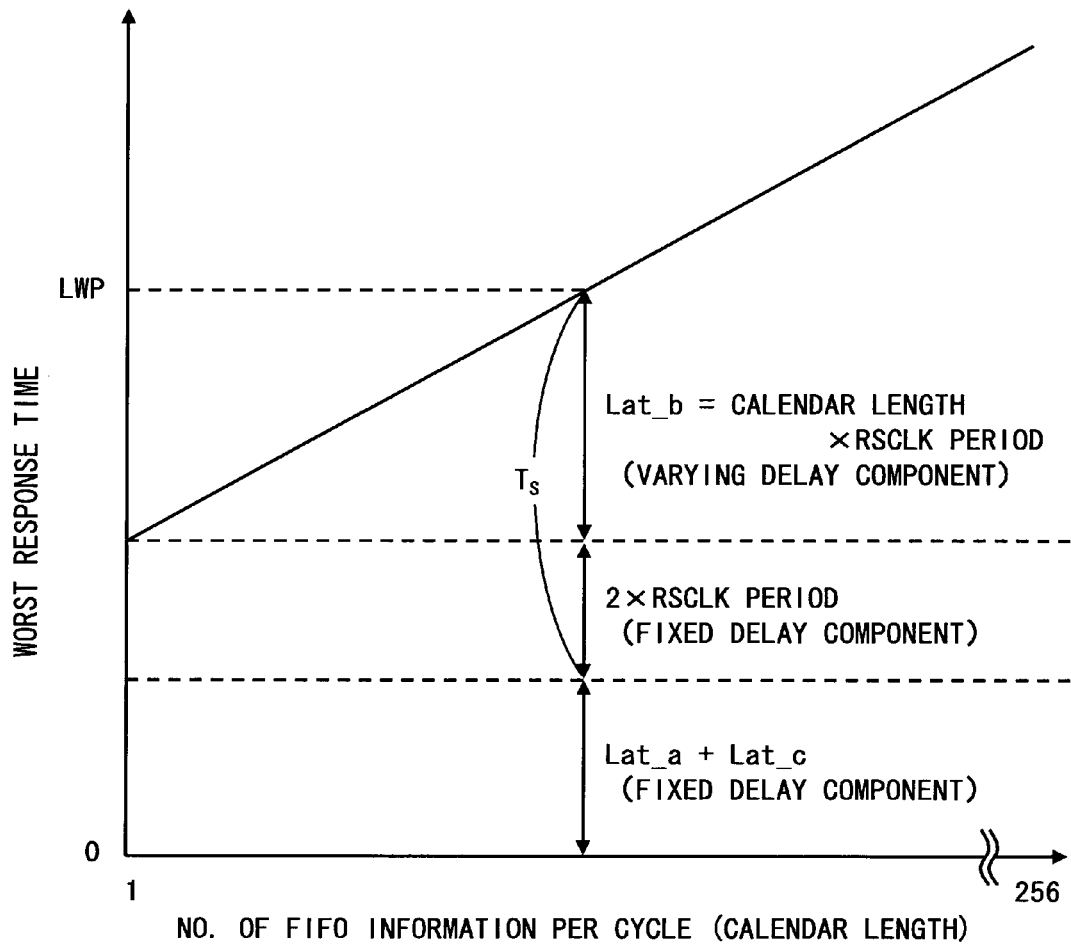
FIG. 14 is a graph showing worst response time in case of a flow control by the SPI-4.2 according to a related art.

On the other hand, when comparing with the PHY device 8 shown in FIG. 8, the PHY device 2 shown in FIG. 1 is different in the point that a flow control can be performed according to FIFO information transferred from the link layer device 1 using TDAT.

The transmit unit 21 included in the PHY device 2 includes a data output unit 211 and a FIFO information receive unit 212. The data output unit 211 outputs payload data and a control word to RDAT. The FIFO information receive unit 212 outputs a stop signal S1 to the data output unit 211 based on the FIFO information obtained from the opposing link layer device 1 via RSTAT. The stop signal S1 is output when the usage status of one of the FIFO buffers 122 to 125 is the SATISFIED status which is indicated by FIFO information. The data output unit 211 which received the stop signal S1 suspends outputting data to a data transmission port (not shown) connected with RDAT until the stop signal is canceled. More specifically, the data output unit 211 stops transmitting payload data at least to a FIFO buffer which is in the SATISFIED status among the FIFO buffers 122 to 125.

The receive unit 22 included in the PHY device 2 is formed including a FIFO information extract unit 221. The FIFO information extract unit 221 extracts FIFO information inserted between payload data transferred over TDAT, and outputs a stop signal S2 to the data output unit 211 based on the extracted FIFO information. The stop signal S2 is output when the usage status of one of the FIFO buffers 122 to 125 is the SATISFIED status which is indicated by the FIFO information. Operation of the data output unit 211 which received the stop signal S2 is the same as that of the case when receiving the abovementioned stop signal S1.

Figure 2:
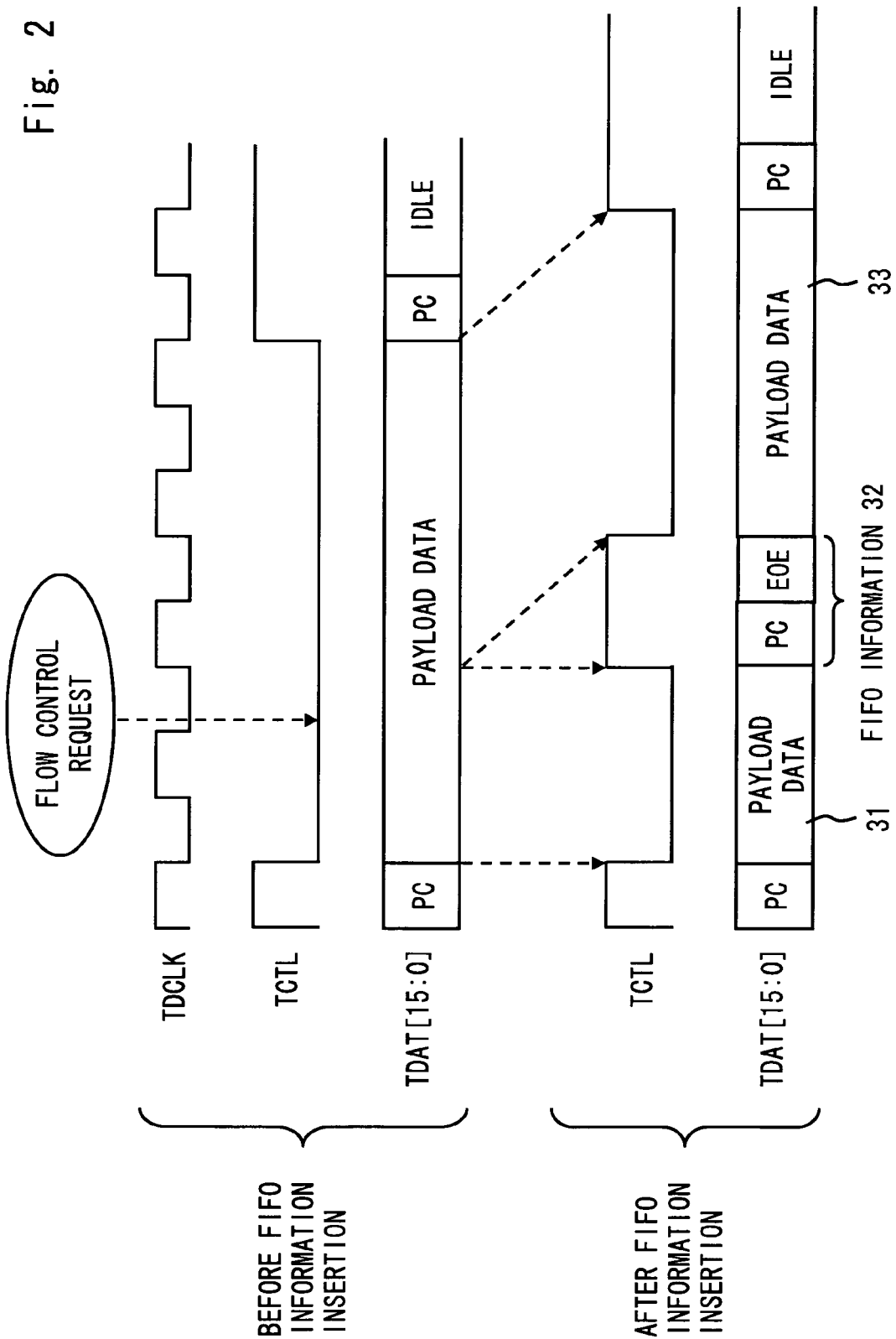
FIG. 2 explains a flow control using a data channel.

Subsequently, the insertion process of the FIFO information between payload data performed by the FIFO information insert unit 113 is explained with reference to FIG. 2 hereinafter. FIG. 2 shows a waveform chart at the time of inserting FIFO information into payload data which is transferred to TDAT. Three signals TDCLK, TCTL and TDAT shown in the upper part of FIG. 2 are signal waveform charts in case FIFO information is not inserted to TDAT. On the other hand, two signals TCTL and TDAT shown in the lower part of FIG. 2 are signal waveform charts when FIFO information 32 is inserted to TDAT. Payload data is divided into a first half 31 and a latter half 33 by the insertion of the FIFO information 32. Moreover, in order to notify to the opposing PHY device 2 that the FIFO information is inserted, TCTL is set as High level in response to the insertion of the FIFO information.

In FIG. 2, "PC" indicates a payload control word defined by the SPI-4 Phase 2 standard. "EOE" indicates "End of Control Word Extension" defined in the SPI-4 Phase 2 standard Appendix E. In the example shown in FIG. 2, FIFO information is transferred with the combination of PC and EOE.

Figure 3:
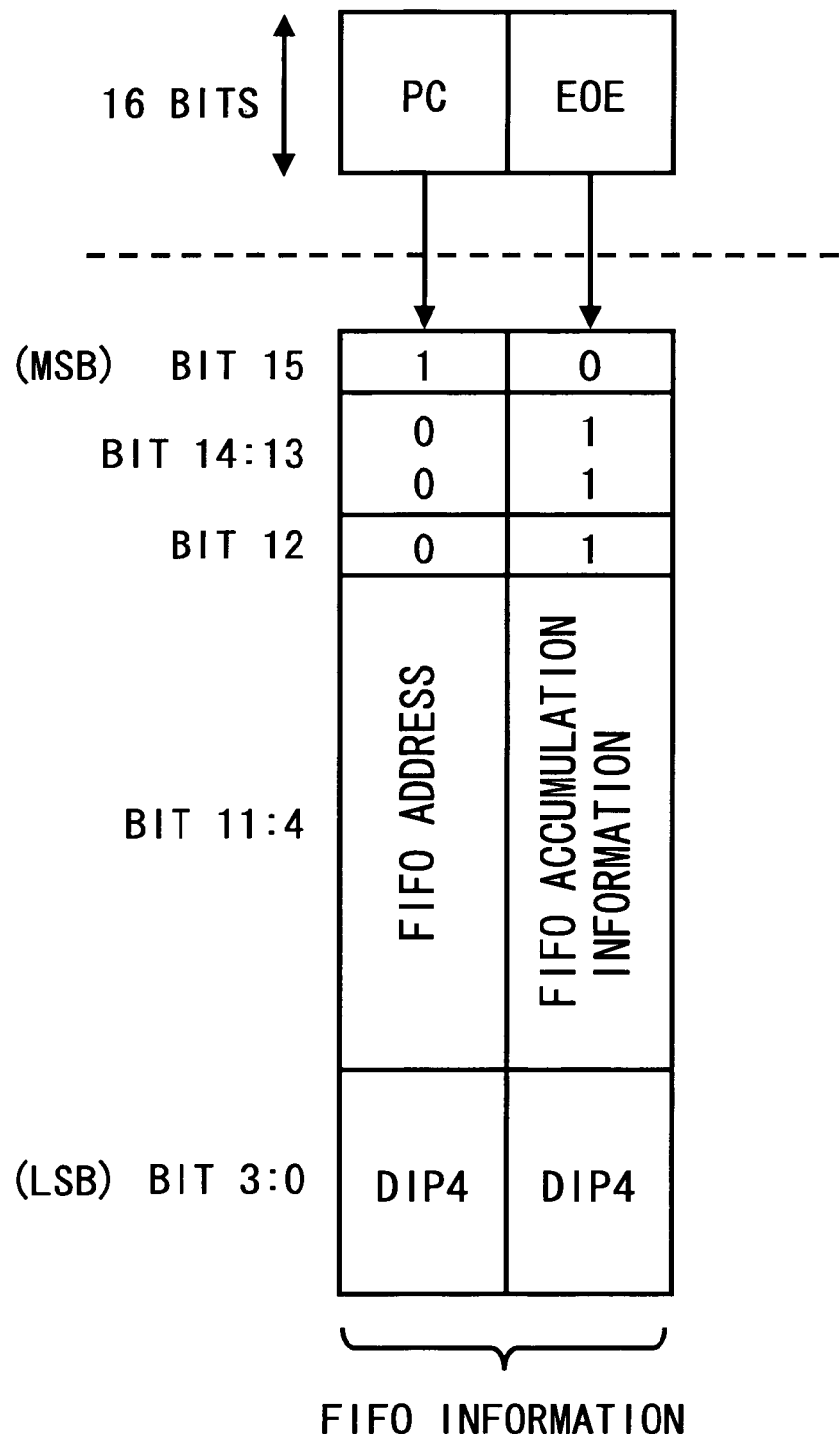
FIG. 3 illustrates an example of FIFO information inserted to a data channel.

An example of the bit allocation in the case of transferring FIFO information concerning one FIFO buffer by 4 bytes of PC and EOE is shown in FIG. 3. In the example shown in FIG. 3, from the 4th bit to the 11th bit of PC is allocated for transferring a FIFO address, and from the 4th bit to the 11th bit of EOE is allocated for transferring FIFO accumulation information which indicates the usage status of a FIFO buffer. The contents of each bit of PC and EOE other than these are specified by the SPI-4 Phase 2 standard.

According to the bit allocation shown in FIG. 3, 8 bits included in EOE are allocated to the FIFO accumulation information which indicates the usage status of FIFO. Therefore, the usage condition of maximum of 256 kinds of detailed FIFO buffers can be notified to the opposing device. Therefore, more detailed flow control can be performed compared with the flow control based on classification of three kinds of status according to a conventional technique. Moreover, in the example shown in FIG. 3, since the FIFO address is transferred collectively, a FIFO buffer to suspend data can be specified and data transmission only to the corresponding FIFO buffer can be selectively suspended.

Figure 4:
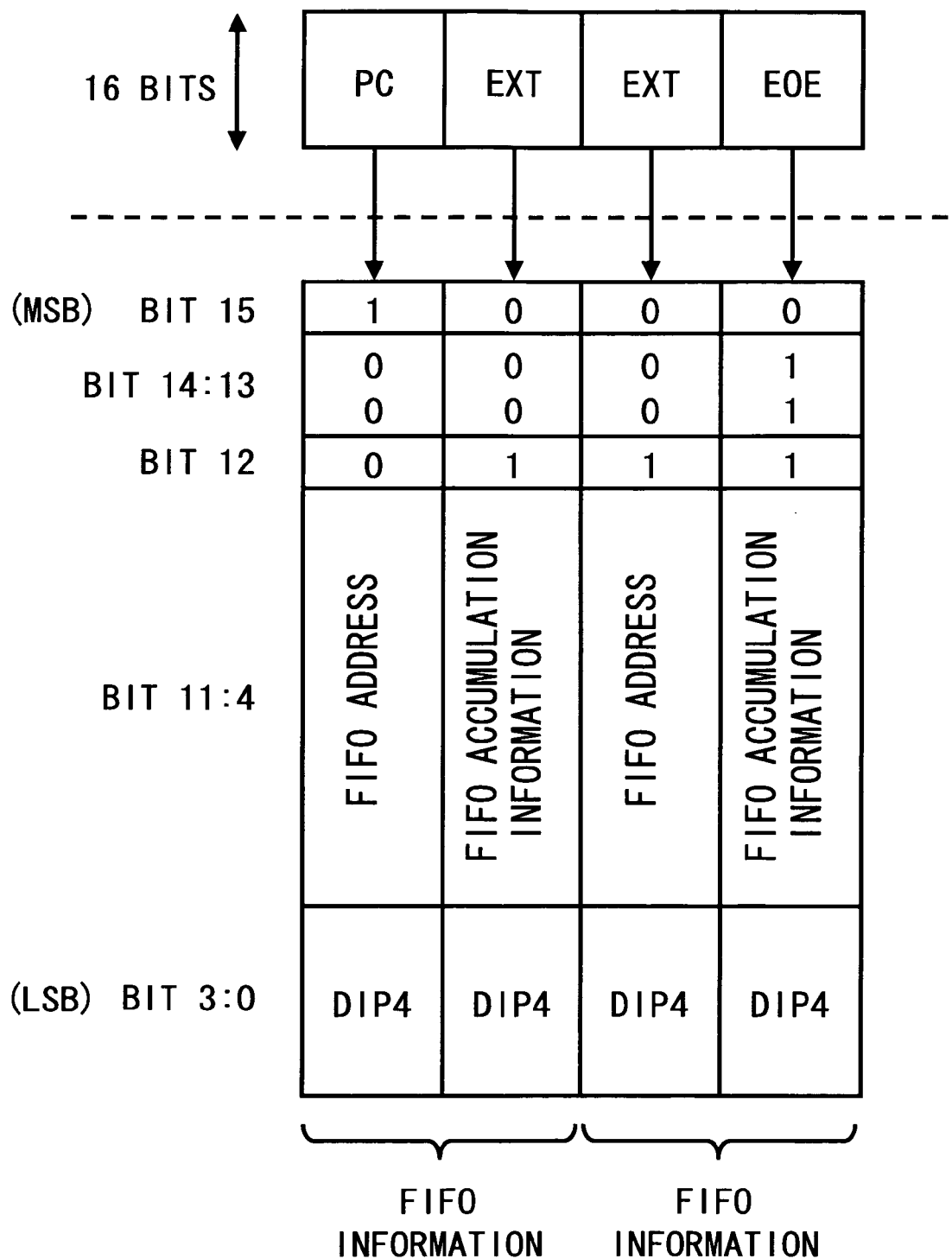
FIG. 4 illustrates an example of FIFO information inserted to a data channel.

Note that the configuration shown in FIGS. 2 and 3 for transferring FIFO information by 4 bytes of PC and EOE is only an example. For example, as shown in FIG. 4, not only PC and EOE but "EXT (Extension Control)" specified in the SPI-4 Phase 2 standard Appendix E can be used for transferring FIFO information.

Figure 5:
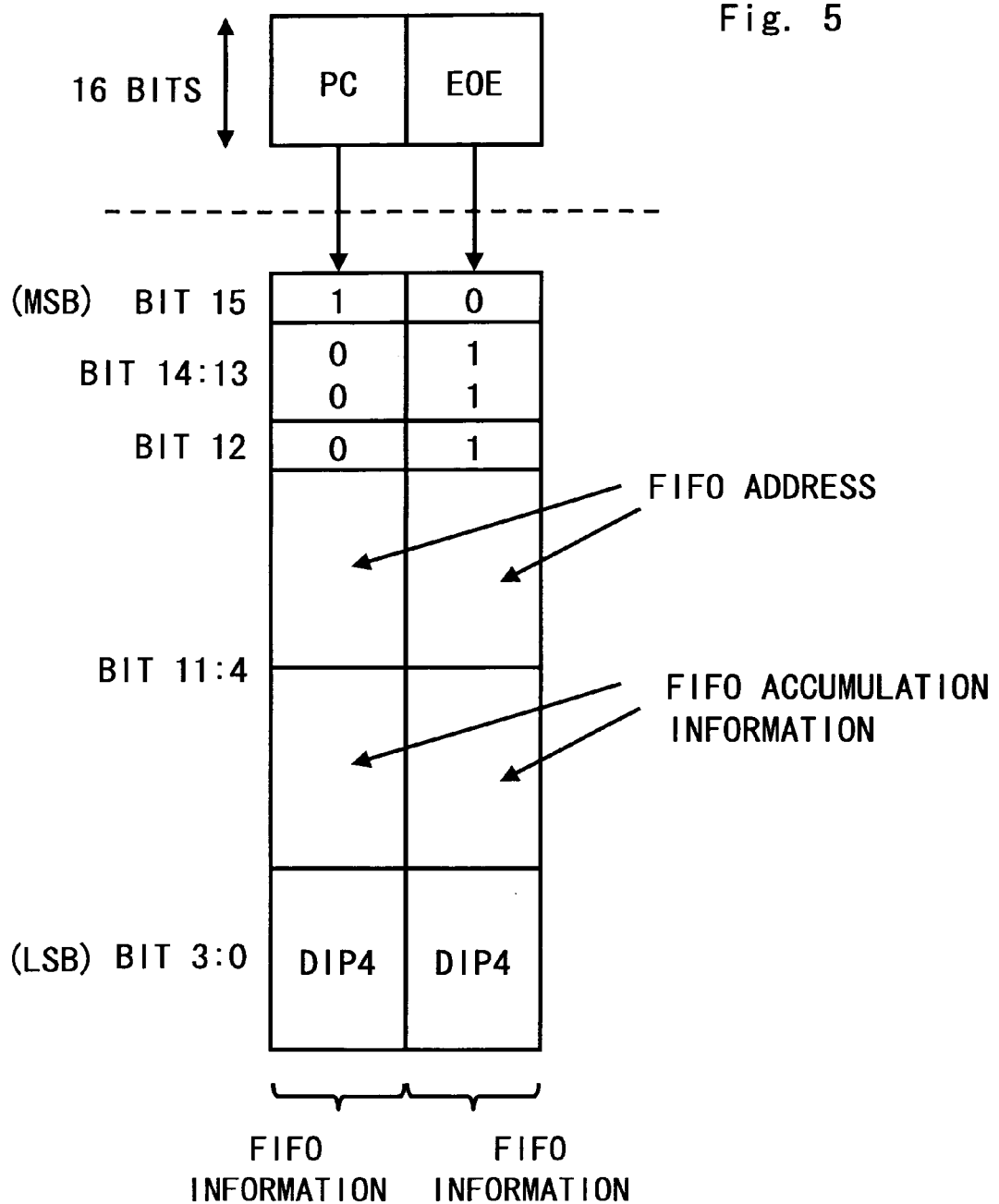
FIG. 5 illustrates an example of FIFO information inserted to a data channel.

As shown in FIG. 5, FIFO information concerning one FIFO buffer may be transferred by each of PC and EOE. According to such a configuration, FIFO information can be transmitted to the opposing device faster as compared with the example shown in FIG. 3.

As mentioned above, in this embodiment, the link layer device 1 is to send FIFO information which should be transmitted preferentially and urgently using the data channel (TDAT) without waiting to transmit over the status channel (RSTAT). Moreover, the PHY device 2 performs flow control corresponding to the FIFO information received from the data channel (TDAT). Accordingly, in the conventional SPI-4 interface, unlike the configuration which transfers all the FIFO information periodically over the status channel, priorities can be given to FIFO information, and flow control can be promptly performed according to the FIFO information with higher priority.

Figure 6:
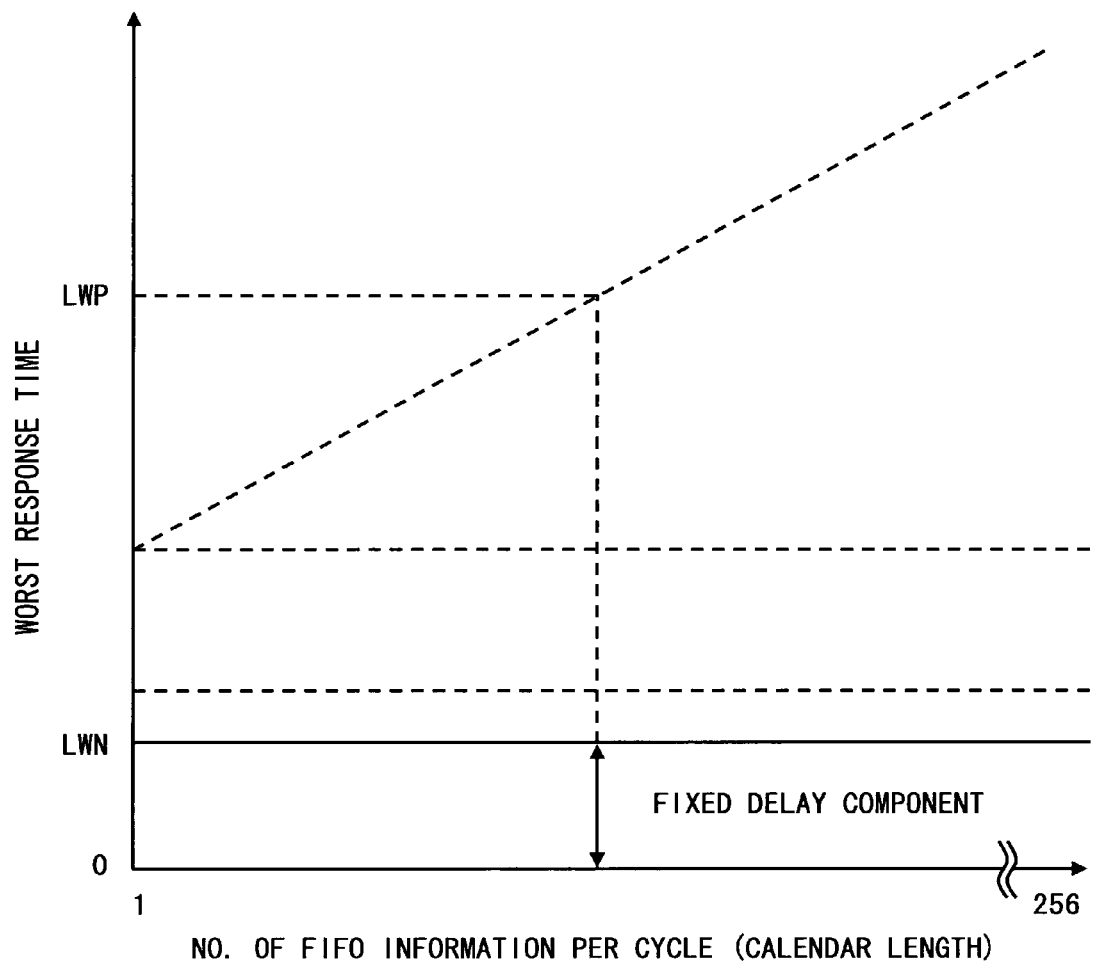
FIG. 6 is a graph showing worst response time in case of a flow control using a data channel according to an embodiment of the present invention.

Furthermore, in this embodiment, FIFO information which should be preferentially and urgently transmitted is transmitted using the data channel (TDAT) without waiting to transmit over the status channel (RSTAT). Therefore, there is an advantage that worst response time from a generation of status change in the FIFO buffer until a flow control is performed by the opposing device does not depend on the calendar length. That is, as shown in FIG. 6, the worst response time LWN in this embodiment does not depend on calendar length and is fixed. Thus, if the worst response time LWN can be estimated only by a fixed delay component, the system design such as determining the above-mentioned first threshold AE and second threshold AF will become easy. Moreover, since the worst response time does not get worse as the calendar length increases, utilization efficiency of the FIFO buffers 122 to 125 can be improved.

Furthermore, as FIFO information is transmitted using the data channel (TDAT) with higher data transmission rate than the status channel (RSTAT), the response time until flow control is performed by an opposite side device can be reduced. In addition, as shown in FIGS. 3 to 5, more detailed information can be transferred in a shorter time than the FIFO information of related arts as compared with the case of using the status channel.

The abovementioned explanation concerning this embodiment illustrated the configuration which performs flow control in "the receive direction" using the FIFO information transferred over the data channel (TDAT) for simplicity of explanation. However, flow control in "the transmit direction" can also be performed using the FIFO information transferred by the data channel (RDAT).

Second Embodiment

In the first embodiment of the present invention, urgent FIFO information which is generated unexpectedly is transferred using the data channels (TDAT and RDAT). Instead of or in addition to the operation of the first embodiment of the present invention, FIFO information can be periodically transferred using the data channels (TDAT and RDAT).

Figure 7:
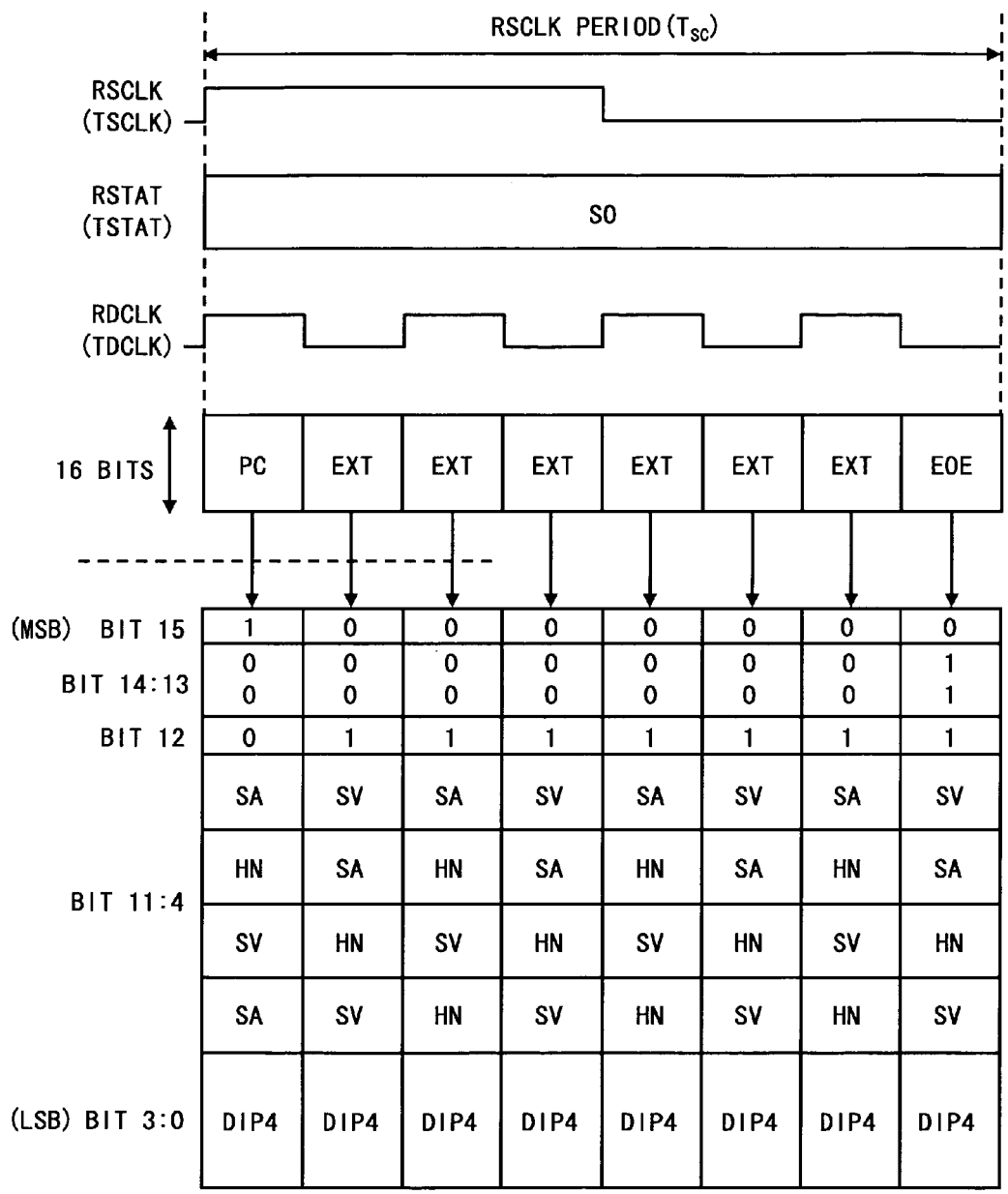
FIG. 7 illustrates an example of FIFO information inserted to a data channel.

FIG. 7 is a waveform chart showing an example of transferring FIFO information periodically using the data channels (TDAT and RDAT). If the transmit order of the FIFO information is determined beforehand, it is not necessary to collectively transfer a FIFO address when transmitting FIFO information periodically. That is, as shown in FIG. 7, all of the 4th bit to the 11th bit of a control word which can be used for transferring FIFO information can be used to transfer FIFO accumulation information. In the example of FIG. 7, the number of bits of FIFO accumulation information for indicating the usage status of each FIFO buffer is 2 bit, as in related arts. As mentioned above, the data clocks (RDCLK and TDCLK) are to have 4 times more frequency than the status clocks (RSCLK and TSCLK) in the SPI-4 Phase 2. Furthermore, a data signal is transmitted to TDAT using both rising and falling edges of the data clocks (RDCLK and TDCLK). Therefore, the transmission rate of the FIFO information in this embodiment is accelerated 32 times more than in related arts.

Other Embodiment

In the first and the second embodiments of the present invention, in order to transfer FIFO information, it may be selectable whether to use only the data channels (TDAT and RDAT), the status channels (TSTAT and RSTAT) or both of them.

It is apparent that the present invention is not limited to the above embodiments but may be modified and changed without departing from the scope and spirit of the invention.

What is claimed is:

1. A communication system complying with SPI-4 Phase 2 standard comprising:
   a local device;
   an opposing device;
   a first data channel to transfer payload data from the local device to the opposing device;
   a second data channel to transfer payload data from the opposing device to the local device; and
   a first status channel to be able to transfer data from the local device to the opposing device,
   wherein the local device comprises:
   a data buffer being configured to store payload data received over the second data channel;
   a buffer status information output unit periodically outputting buffer status information to the first status channel, the buffer status information indicating a usage status of the data buffer; and
   a buffer status information insert unit inserting the buffer status information between the payload data according to a priority of the buffer status information in order to output the buffer status information to the first data channel,
   wherein the opposing device controls to output payload data to the second data channel according to the buffer status information received over the first status channel and the first data channel.

2. The communication system according to claim 1, wherein the opposing device comprises:
   a buffer status information receive unit receiving the buffer status information via the first status channel;
   a buffer status information extract unit extracting the buffer status information from data received over the first data channel; and
   a data output unit being able to suspend outputting payload data to the second data channel according to the buffer status information received by the buffer status information receive unit and the buffer status information extract unit.

3. The communication system according to claim 1, wherein the insertion of the buffer status information between the payload data is performed in response to an excess of an amount of data stored in the data buffer over a predetermined threshold.

4. The communication system according to claim 1, wherein the buffer status information insert unit inserts identification information identifying the data buffer to the payload data, in addition to the buffer status information.

5. The communication system according to claim 1, wherein the insertion of the buffer status information between the payload data is periodically performed.

6. The communication system according to claim 1, wherein a transmission amount for each unit time of the buffer status information inserted to the payload data is larger than a transmission amount for each of the unit time of the buffer status information output to the first status channel.

7. The communication system according to claim 1, wherein the number of the status of the data buffer identifiable by the buffer status information inserted to the payload data is larger than the number of the status of the data buffer identifiable by the buffer status information output to the first status channel.

8. The communication system according to claim 1, wherein the buffer status information includes a buffer address and buffer accumulation information indicating a usage status of the data buffer, and
   the buffer status information insert unit allocates the buffer address and the buffer accumulation information to an extension control in order to transfer the buffer status information.

9. A communication device complying with SPI-4 Phase 2 standard to transmit and receive data with an opposing device, the communication device comprising:
   a data transmission port to transmit payload data to the opposing device;
   a data receive port to receive payload data from the opposing device;
   a data buffer to store payload data received from the data receive port;
   a status transmission port provided to periodically transmit buffer status information indicating a usage status of the data buffer to the opposing device, the status transmission port having a data transmission rate lower than the data transmission port;
   a buffer status information output unit outputting the buffer status information to the first status signal port; and
   a buffer status information insert unit inserting the buffer status information between the payload data in order to output the buffer status information to the data transmission port.

10. The communication device according to claim 9, wherein the buffer status information insert unit inserts the buffer status information between the payload data in case an amount of data stored in the data buffer exceeds a predetermined threshold.

11. The communication device according to claim 9, wherein the buffer status information insert unit determines whether or not to insert the buffer status information between the payload data according to a priority of the buffer status information.

12. The communication device according to claim 9, wherein the buffer status information insert unit inserts identification information identifying the data buffer to the payload data, in addition to the buffer status information.

13. The communication device according to claim 9, wherein a transmission amount for each unit time of the buffer status information inserted to the payload data is larger than a transmission amount for each of the unit time of the buffer s a us information transmitted from the status transmission port.

14. The communication device according to claim 9, wherein the number of the status of the data buffer identifiable by the buffer status information inserted to the payload data is larger than the number of the status of the data buffer identifiable by the buffer status information transmitted from the status transmission port.

15. A method of flow control in a communication system complying with SPI-4 Phase 2 standard including a local device, an opposing device, a first data channel to transfer payload data from the local device to the opposing device, a second data channel to transfer payload data from the opposing device to the local device and a first status channel to be able to transfer data from the local device to the opposing device, the method comprising:

- transmitting, by the local device, buffer status information indicating a usage status of a data buffer periodically to the first status channel, the data buffer storing payload data received over the second data channel;
- inserting, by the local device, the buffer status information between the payload data according to a priority of the buffer status information and outputting to the first data channel; and
- controlling, by the opposing device, to output payload data to the second data channel based on the status information received over the first status channel and the first data channel.

16. The method according to claim 15, wherein the insertion of the buffer status information between the payload data by the local device is performed in response to an excess of an amount of data stored in the data buffer over a predetermined threshold.

17. The method according to claim 15, wherein the local device determines whether or not to insert the buffer status information between the payload data according to a priority of the buffer status information.

18. The method according to claim 15, wherein the local device inserts identification information identifying the data buffer to the payload data, in addition to the buffer status information.

19. The method according to claim 15, wherein a transmission amount for each unit time of the buffer status information inserted to the payload data is larger than a transmission amount for each of the unit time of the buffer status information output to the first status channel.

20. The method according to claim 15, wherein the number of the status of the data buffer identifiable by the buffer status information inserted to the payload data is larger than the number of the status of the data buffer identifiable by the buffer status information output to the first status channel.

* * * * *